Aug. 20, 1929.   M. R. WOLFARD   1,725,607

THERMOSTATIC DEVICE

Filed April 12, 1927   2 Sheets-Sheet 1

Inventor.
Merl R. Wolfard
by Heard Smith & Tennant.
Attys.

Aug. 20, 1929.  M. R. WOLFARD  1,725,607
THERMOSTATIC DEVICE
Filed April 12, 1927   2 Sheets-Sheet 2
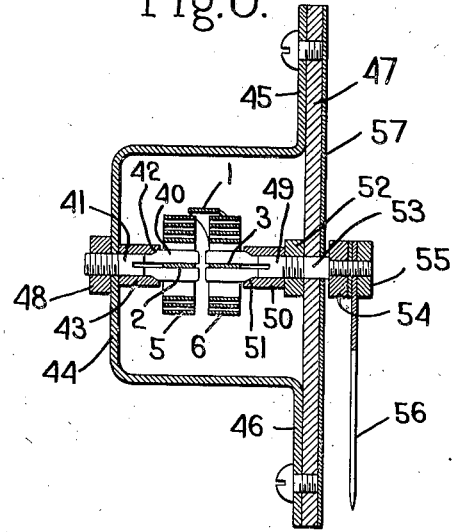
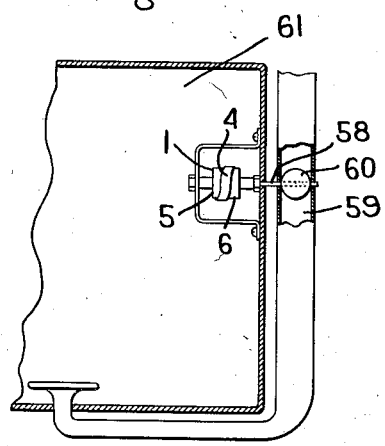
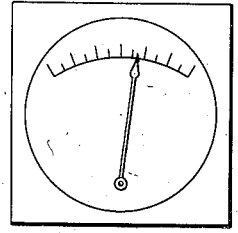
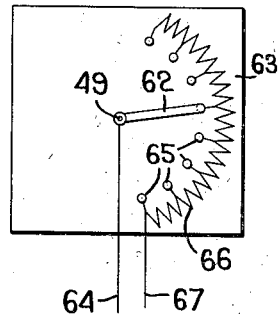
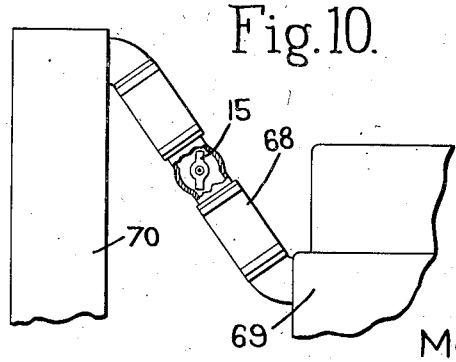
Inventor.
Merl R. Wolfard
by Heard Smith & Tennant.
Attys.

Patented Aug. 20, 1929.

1,725,607

UNITED STATES PATENT OFFICE.

MERL R. WOLFARD, OF CAMBRIDGE, MASSACHUSETTS, ASSIGNOR TO CHARLES F. HOPEWELL AND HELEN C. HOPEWELL, OF WATERTOWN, MASSACHUSETTS, A COPARTNERSHIP DOING BUSINESS AS HOPEWELL BROTHERS.

THERMOSTATIC DEVICE.

Application filed April 12, 1927. Serial No. 183,163.

This invention relates to improvements in thermostatic devices and the object thereof is to provide a thermostatic element or member of relatively small and compact form capable of producing a greater amount of relative movement between the ends thereof than has heretofore been obtained in similar thermostatic devices.

More specifically the object of the invention is to provide a thermostatic device comprising a thermo-expansible member having its ends wound inwardly from the central portion thereof to form a double spiral coil. Preferably the spiral coils are wound flat and disposed in parallelism in proximity to each other. By the use of a double spiral coil of this character a maximum stiffness for a given length and thickness of the thermostatic member is attained. Furthermore, a thermostatic member of sufficient length to give a proper amplitude of motion may be wound into such a small space that it can readily be enclosed within a suitable casing, such as the hollow body of a valve.

A further object of the invention is to provide the ends of the thermostatic members, which are located at substantially the axes of the spiral coils, with novel attachments, one of which may be anchored, and the other of which may be rotated relatively thereto by the expansion and contraction of the thermostatic member.

A further object of the invention is to provide a thermostatic device of this character which is adaptible to numerous uses.

Other objects and features of the invention will more fully appear from the following description and the accompanying drawings and will be particularly pointed out in the claims.

The present application is a continuation in part of, my prior application Serial Number 735,946 filed September 4, 1924 for thermostatic controls for carbureters, and Figures 1, 2, 3, 4 and 5 of the present drawings are duplicates of figures numbered 9, 11, 3, 5 and 6 respectively of the drawings of that application.

The prior application is addressed to thermostatic controls for carbureters comprising a conduit leading to the carbureter and having at its opposite end a cold air inlet with a branch pipe leading upwardly from said conduit to a heating means. The cold air conduit is provided with a valve which is connected by certain actuating mechanism to a hot air valve in which the thermostat is enclosed.

The present application is addressed broadly to the thermostatic device embodying the present invention as applied not only to valve mechanisms for controlling the supply of hot and cold air to a carbureter, but also to other regulating and indicating mechanisms, illustrative examples of which are shown in the accompanying drawings.

In the drawings:

Fig. 1 is a vertical longitudinal sectional view of the inlets for hot and cold air to a carbureter showing in elevation a choke valve in the hot air inlet embodying the invention and a valve in the cold air inlet in cold starting position;

Fig. 2 is a similar view illustrating the relative positions of the choke valve and cold air valve when the hot air inlet is in a highly heated condition and in which the thermostatically-controlled choke valve has restricted the supply of hot air, while the cold air valve is in position to admit substantially a maximum amount of cold air, as for example during the operation of the engine in hot weather;

Fig. 6 is a view mainly in vertical section illustrating a thermostatic device comprising a continuous thermo-expansible member in the form of a double spiral coil as employed in connection with an indicating device;

Fig. 7 is a view partly in vertical section of a thermostatic device embodying the invention herein employed to regulate the flow of fluid through a conduit leading to or from an enclosure;

Fig. 8 is a front view of the dial and index shown in Fig. 6;

Figure 1:
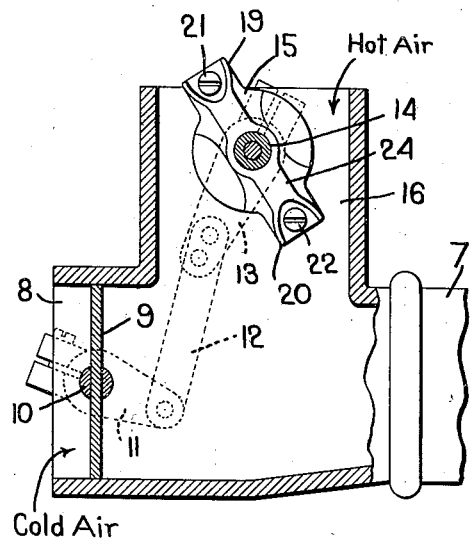
Figure 2:
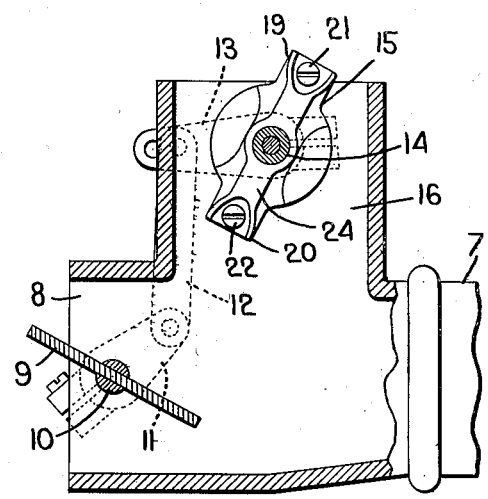

Fig. 9 illustrates a rheostat in which an arm controlled by a thermostat embodying the invention is utilized automatically to regulate the resistance interposed in an electric circuit; and, Fig. 10 is a view illustrating a thermostatically operated valve embodying the invention controlling the flow of a fluid through a conduit such as the conduit leading from the water jacket of an internal combustion engine to the radiator.

The invention in its broad sense comprises the use of a thermo-expansible member in the form of a double spiral coil. The thermostatic member may be of any suitable material or construction, but preferably comprises a bi-metallic strip of metal 1, preferably of rectangular cross section and uniform width throughout its length, having its ends 2 and 3 wound inwardly from its central portion 4 progressively toward a common axis, to provide a double spiral coil, the coils 5 and 6 of which are located in parallel planes with the extreme ends 2 and 3 bent abruptly to cross the axes of the spirals, which desirably are in alinement.

Suitable means are connected to the ends of the thermo-expansible member to extend axially therefrom in opposite directions and means are provided for anchoring one of said ends while the device, which is secured to the opposite end of the thermo-expansible member, is permitted to rotate in response to the change in curvature of the spirals of the coil when the coil is subjected to changes in temperature.

The preferred mechanism for accomplishing this purpose comprises a pair of axially alined shafts, which are connected to the respective ends of the thermostatic member, with means for anchoring one of said shafts against rotation and means for permitting rotation of the other shaft. In the embodiment of the invention illustrated in Figs. 1, 2, 3 and 4 the thermostatic double spiral coil is employed to actuate a choke valve in the hot air inlet of the carbureter. In this construction the conduit 7, which leads to the carbureter, has a cylindrical open inlet end 8 for cold air which is controlled by a valve 9, the shaft 10 of which extends diametrically across the conduit and is journalled in the walls thereof, and is provided exteriorly of the conduit with an arm 11 which is pivotally connected to one end of a link 12, the other end of which is pivotally connected to one end of an arm 13 the opposite end of which arm is fixedly secured to a shaft 14 which is rigidly connected to, and rotatable in unison with, a thermostatically operated chock valve 15 located in a branch conduit 16 extending from the conduit 7, which leads to the carbureter, to a suitable air heating device such as a "hot stove" of an internal combustion engine.

Figure 3:
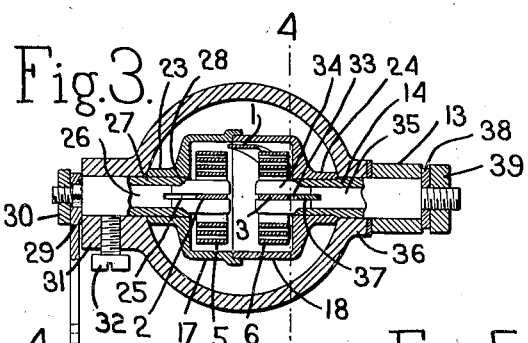
Fig. 3 is a view, mainly in longitudinal section through the choke valve illustrated in Figs. 1 and 2, and the thermostatic device by which it is controlled.
Figure 4:
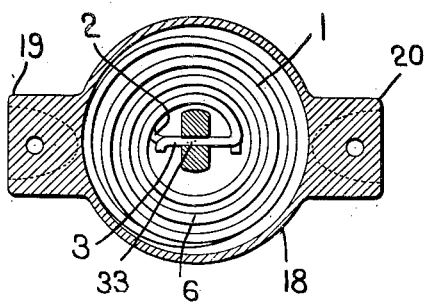
Fig. 4 is a vertical sectional view on line 4—4 Fig. 3.
Figure 5:
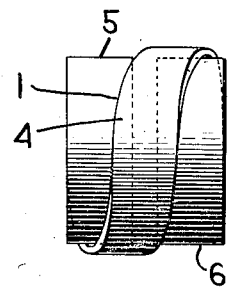
Fig. 5 is an elevation of a continuous thermo-expansible member having its ends wound inwardly from the central portion thereof to form a double spiral coil as illustrated in Figs. 3 and 4.

The preferred form of choke valve 15, which is illustrated in the accompanying drawings, comprises a two-part casing having complementary cylindrical portions 17 and 18 the adjacent ends of which are telescopically arranged as illustrated in Fig. 3. The cylindrical portions 17 and 18 are provided with radially opposite extensions 19 and 20 which form the extremities of a butterfly valve, and these extensions are secured together respectively by screws 21 and 22. The cylindrical portions 17 and 18 preferably do not extend the full length of the valve, but are tapered down to present relatively narrow end portions 23 and 24 adjacent the wall of the casing to prevent sticking when dust or grit accumulates upon the casing and also to permit passage of an increased amount of air by the valve when the valve is rotated toward open position over that which would be permitted to pass through the conduit 16 if the cylindrical portion of the valve casing should extend completely to the inner wall of the conduit.

The double coil thermostatic device above described is located within the chamber of the choke valve 15 formed by the cylindrical central portions 17 and 18. The end 2 of the coil 5 extends through a slot 25 in the head of a clamping rod or shaft 26 which passes axially through a hollow shaft or sleeve 27 upon which the ends of the choke valve is rotatably mounted. The head of the clamping rod or shaft 26 is flattened on opposite sides and is provided with a tapering shoulder 28 which engages a complementary tapered surface in the adjacent end of the hollow shaft or sleeve 27. The slot in the head is perpendicular to the flattened faces of the head and extends into the clamping rod or shaft well beyond the shoulder 28 of the head. The other end of the clamping rod or shaft 26 is screw threaded and is provided with a lock washer 29 and nut 30. The lock washer desirably may be in the form of an arm adapted to be controlled from any convenient location to adjust the initial position of the thermostat. When, therefore, the nut 30 is set up the clamping rod 26 will be moved axially and the tapered shoulder of the head will be drawn tightly against the complementary taper in the end of the hollow shaft or sleeve 27 and the sections of the head will thereby be caused to clamp tightly upon the end 2 of the thermostatic coil. The rod 26 and the hollow shaft 27 will also be clamped firmly together.

In the construction illustrated in the drawings, one end of the hollow shaft 27 passes through a boss 31 extending radially outwardly from the wall of the inlet conduit 16 and may be secured against rotation by a set screw 32 which passes through the boss 31 and engages the sleeve 27 to anchor the end 2 of the thermostatic coil against rotation if the adjusting arm is not desired.

The opposite end 3 of the other spiral 6 of the thermostatic coil is similarly clamped in a slot 33 in the flattened head 34 of a rod or shaft 35, which is tapered down to a cylindrical portion which passes axially through the hollow shaft or sleeve 14 to which the arm 13, which is connected to the cold air valve, is secured. The hollow shaft or sleeve 14 is provided with an internally tapered end complementary to the tapered shoulder of the head and is rotatably mounted in a boss 36 projecting from the wall of the hot air inlet conduit 16 in axial alinement with the boss 31. The hollow shaft 14 is slotted at its inner end in alinement with the slot 33 in the clamping rod 35 and a positioning key 37 extends through this slot into the surrounding end portion of the choke valve. The clamping rod 35 has a screw threaded end portion upon which a washer 38 and nut 39 are mounted, the washer 38 engaging the outer end of the hollow shaft 14. When the nut upon the clamping rod 35, therefore, is set up it draws the rod axially and not only clamps the head on the end 3 of the spiral coil, as heretofore described, but also expands the slotted end of the hollow shaft so as to clamp it into the end 24 of the valve.

By reason of this construction it will be obvious that inasmuch as the end 2 of the thermostatic coil is rigidly anchored through the clamping rod 26, the hollow shaft or sleeve 27, the washer and nut 30, and set screw 39, to the wall of the conduit 16, and the other end 3 of the coil is secured through the clamping rod 35 and the hollow shaft 14, which is rotatably mounted in the boss 36 extending from the wall of the conduit 16, that variations in temperature of the hot air which effect the thermostatic coil will cause a rotation of the choke valve 15.

By the use of a continuous double spiral coil of rectangular cross section in which the width of the section is preferably more than three times its thickness and the ends of which are wound inwardly progressively toward a common axis as heretofore described, a maximum stiffness for a given length and thickness of a strip of thermostatic metal is attained. Furthermore, a sufficient length of thermostatic metal to give proper amplitude of motion may be wound into such a small space that it can be readily enclosed in the choke valve.

In the operation of the device illustrated in Fig. 1, which is fully set forth in the application of which this is a division, the thermostatic choke valve 15 is initially arranged in the position oblique to the longitudinal axis of the hot air inlet pipe 16, as illustrated in Fig. 1. The connections between the choke valve and the cold air valve are such that at the cold starting position of an engine, as illustrated in Fig. 1, the cold air valve 9 is in a position completely to close the cold air inlet. When, therefore, the engine is started, all air admitted to the carbureter will pass through the hot air inlet conduit 16 and consequently envelop the thermostatic choke valve. It will be noted that the valve 15 in starting position is so located as to choke the passage through the conduit 16, thereby producing a partial vacuum in the conduit 7 leading to the carbureter which will cause the supply of an amount of fuel greater than that which is normally required, thereby producing a powerful explosive mixture for the engine. As the engine warms up the temperature of the air passing through the conduit 16 increases and the expansion of the thermostatic coil rotates the choke valve toward a vertical position, thereby progressively increasing the amount of air supplied and gradually reducing the amount of vacuum in the conduit 7, thus in turn reducing the amount of fuel in the mixture. During this warming-up period the cold air valve is gradually opened. When, however, the temperature of the engine has increased sufficiently to cause the rotation of the valve beyond central position in the conduit 16 the valve will gradually exert a choking action upon the amount of hot air drawn into the conduit 7 and the connections between the choke valve and the cold air valves are so arranged that the cold air valve will be opened much more rapidly, thus supplying sufficient cold air to mix with the hot air to produce a mixture of the desired temperature. The conjoint action of these valves also serves to regulate the degree of vacuum in the conduit leading to the engine and consequently to regulate the amount of fuel supplied to the air flowing through the conduit. The functions of the thermostatically operated valve, when employed in the manner above described, are more fully set forth in detail in the prior application herein mentioned.

Numerous other adaptations and uses of the thermostat herein described may be made, certain of which are illustrated in the remaining figures of the drawings.

In Fig. 6 of the drawings a double thermostatic coil is illustrated in which the end 2 of the spiral 5 is secured in the split head 40 of a clamping rod 41 which is provided with a beveled shoulder 42 engaging a complementary bevel in the end of a sleeve 43 which is interposed between said shoulder and the wall 44 of a U-shaped bracket having flanges 45 and 46 which are secured to a suitable wall or plate 47. A nut 48, upon the screw threaded end of the clamping screw, when set up draws the beveled shoulder 42 within the complementary beveled end of the sleeve 43, thus clamping the split head upon the end 2 of the spiral and as the nut 48 engages the side of the bracket 44 the sleeve 43 is drawn against the opposite side of the bracket so that the clamping rod 40 is held against rotation.

The opposite end 3 of the thermostatic member, which is the end of the spiral 6, is clamped in a slot in the end of a shaft 49 in a similar manner by a sleeve 50 which is provided with an internally beveled end portion 51 which engages the complementary beveled shoulder upon the head of the rod 49. In this construction the shaft 49 is provided with a screw threaded portion having thereupon a nut 52 which engages the outer end of the sleeve 50 and when rotated against the end of the sleeve produces the clamping action herein described. A cylindrical portion 53 of the shaft 49 extends through a suitable bearing in the wall 47 and has secured to it by outer and inner nuts 54 and 55 an index arm 56 which may be made to co-operate with a suitable dial 57 secured to the plate 47 which may be arbitrarily graduated to indicate temperature conditions. The use of such dial is indicated in Fig. 8.

The arm 56, or other suitable connection, may be connected to regulating apparatus adapted to control the amount of heat supplied to the chamber in which the thermostat is located, or to produce such other regulation as may be found desirable.

Fig. 7 shows a similar thermostatic device to that illustrated in Fig. 6 in which the shaft 49 is provided with an extension 58 which projects into or through a flue 59 and has secured to it a valve 60 which is operable by the action of the thermostat to regulate the passage of air, or other gaseous material, through the flue, either to or from a chamber 61.

In Fig. 9 the rotatable shaft 49 of the thermostatic device is shown as connected to the arm 62 of a rheostat 63, an electric current being supplied through a suitable conductor 64 to the arm 62 which is adapted when moved progressively to contact with terminals 65 of a resistance 66, one end of such resistance being connected to the return branch 67 of the electric circuit.

In Fig. 10 the thermostatic choke valve 15 of the type heretofore described is shown as embodied in the conduit 68 leading from the water jacket of an internal combustion engine 69 to the radiator 70, thereby controlling the flow of water from the water jacket through the radiator for the purpose of maintaining the water in the water jacket at a desired temperature, for it will be obvious that if the flow of water through the water jacket is partly shut off when the valve is in the position indicated in Fig. 10 it will become highly heated and as its temperature increases the choke valve 15 will rotate toward the axial plane of the conduit, thereby permitting the water to flow more freely through the conduit to the radiator. In such and similar uses, however, the thermostatic valve should be so constructed that a maximum degree of temperature of the water in the water jacket of the engine will not cause it to pass wide open position, or means provided to arrest further movement of the thermostat when wide open position is reached.

It will be understood that the constructions in which the double spiral thermostatic device is embodied, which are shown and described herein, are illustrative merely and that the invention may be embodied in various other forms of devices. It will also be understood that the double spiral thermostat herein described may be employed for numerous uses which are not mentioned herein within the meaning and scope of the following claims.

Having thus described the invention, what is claimed as new, and desired to be secured by Letters Patent, is:

1. A thermostatic device comprising a continuous, thermo-expansible member having its ends wound inwardly from the central portion thereof progressively toward a common axis to form a double spiral coil.

2. A thermostatic device comprising a thermo-expansible member having its ends wound inwardly from the central portion thereof progressively toward a common axis to present substantially flat parallel spiral coils.

3. A thermostatic device comprising a flat, thermo-expansible strip of substantially uniform width having its ends wound inwardly from the central portion thereof progressively toward a common axis to present substantially flat parallel spiral coils.

4. A thermostatic device comprising a flat bi-metallic strip having its ends wound inwardly from the central portion thereof progressively toward a common axis to present substantially flat parallel spiral coils.

5. A thermostatic device comprising a thermostatic member having its ends wound inwardly from the central portion thereof progressively toward a common axis to present flat substantially parallel spiral coils and axially alined members connected respectively to the ends of said thermo-expansible member.

6. A thermostatic device comprising a thermo-expansible member having its ends wound inwardly from the central portion thereof progressively toward a common axis to present flat substantially parallel spiral coils, axially alined members connected respectively to the ends of said thermo-expansible member, means for anchoring one of said members and regulating means connected to the other end of said member.

7. A thermostatic device comprising a thermo-expansible member having its ends wound inwardly from the central portion thereof progressively toward a common axis to present flat, substantially parallel, spiral coils, axially alined members connected respectively to the ends of said thermo-expansible member, means connected to one end of said thermo-expansible member operable to adjust the initial position thereof and means operable by the movement of said thermo-expansible member connected to the other end of said member.

8. A thermostatic device comprising a flat, thermo-expansible strip having its ends wound spirally inwardly from the central portion thereof progressively toward a common axis to present substantially flat parallel spiral coils, axially alined shafts having diametrically slotted ends embracing the respective ends of said strip and having conically shouldered portions in proximity to the outer edges of the respective coils, sleeves upon said shafts having conically tapered portions complementary to the conical portions of said shafts extending beyond the ends of the slots, means for forcing said sleeves lengthwise of the respective shafts to clamp the bifurcated end portions of the shafts upon the ends of the respective strips.

9. A thermostatic device comprising a flat, thermo-expansible strip having its ends wound spirally inwardly from the central portion thereof progressively toward a common axis to present substantially flat parallel spiral coils, axially alined shafts having diametrically slotted ends embracing the respective ends of said strip and having conically shouldered portions in proximity to the outer edges of the respective coils, sleeves upon said shafts having conically tapered portions complementary to the conical portions of said shafts extending beyond the ends of the slots, means for forcing said sleeves lengthwise of the respective shafts to clamp the bifurcated end portions of the shafts upon the ends of the respective strips, means connected to one of said shafts operable to adjust the initial position thereof, and means operable by the movement of said thermo-expansible strip connected to the other end thereof.

10. A thermostatic device comprising a flat, thermo-expansible strip having its ends wound spirally inwardly from the central portion thereof progressively toward a common axis to present substantially flat parallel spiral coils, axially alined shafts having diametrically slotted ends embracing the respective ends of said strip and having conically shouldered portions in proximity to the outer edges of the respective coils, sleeves upon said shafts having conically tapered portions complementary to the conical portions of said shafts extending beyond the ends of the slots, means for forcing said sleeves lengthwise of the respective shafts to clamp the bifurcated end portions of the shafts upon the ends of the respective strips, means connected to one of said shafts operable to adjust the initial position thereof, and a valve connected to the other of said shafts and rotatable therewith.

11. A thermostatic device comprising a casing, a thermo-expansible member in said casing having its ends wound inwardly from its central portion progressively toward a common axis to present a double spiral coil, means rigidly securing one end of said expansible member to said casing and means external of said casing secured to the other end of said expansible member, rotatable relatively to said casing.

In testimony whereof, I have signed my name to this specification.

MERL R. WOLFARD.